United States Patent [19]

Nakagawa et al.

[11] Patent Number: 4,963,387

[45] Date of Patent: Oct. 16, 1990

[54] SALT SUBSTITUTE AND FOODSTUFFS CONTAINING SAME

[75] Inventors: Takahiro Nakagawa, Osaka; Shiro Tanaka, Tokyo, both of Japan

[73] Assignees: Chugai Seiyaku Kabushiki Kaisha, Tokyo; San-Ei Chemical Industries, Ltd., Osaka, both of Japan

[21] Appl. No.: 195,982

[22] Filed: May 19, 1988

[30] Foreign Application Priority Data

| May 20, 1987 | [JP] | Japan | 62-124970 |
| Jul. 7, 1987 | [JP] | Japan | 62-170088 |
| Jul. 22, 1987 | [JP] | Japan | 62-184201 |
| Jul. 22, 1987 | [JP] | Japan | 62-184202 |
| Jan. 27, 1988 | [JP] | Japan | 63-16700 |
| Jan. 27, 1988 | [JP] | Japan | 63-16701 |

[51] Int. Cl.$^5$ .................. C01D 13/00; A23C 21/00
[52] U.S. Cl. .................. 426/649; 426/650; 426/583
[58] Field of Search .................. 426/649, 650, 583

[56] References Cited

U.S. PATENT DOCUMENTS

| 3,860,732 | 1/1975 | Eisenstadt . | |
| 3,930,056 | 12/1975 | Feminella et al. | 426/583 |
| 4,183,970 | 1/1980 | May et al. | 426/650 |
| 4,243,691 | 1/1981 | Mohlenkamp et al. | 426/649 |
| 4,297,375 | 10/1981 | Shackelford | 426/649 |
| 4,399,164 | 8/1983 | Lauck et al. | 426/583 |
| 4,471,002 | 9/1984 | Buckholz et al. | 426/649 |
| 4,514,431 | 4/1985 | Buckholz et al. | 426/649 |

FOREIGN PATENT DOCUMENTS

| 0124254 | 11/1984 | European Pat. Off. . |
| 0125021 | 11/1984 | European Pat. Off. . |
| 2196151 | 3/1974 | France . |

*Primary Examiner*—Donald E. Czaja
*Assistant Examiner*—Mary S. Mims
*Attorney, Agent, or Firm*—Browdy and Neimark

[57] ABSTRACT

A salt substitute comprising whey mineral which is produced by reducing lactose and protein from whey, an alkali metal salt, and optionally an alkaline earth metal salt is disclosed. A seasoning which is prepared by combining the salt substitute with one or more substances selected from sweeteners, protein hydrolyzates, amino acids and nucleic acid-related substances, as well as a foodstuff containing the salt substitute are also disclosed.

The salt substitute produced by the method described herein has salty taste comparable to that of the common salt when used in the same way of the common salt, and allows the sodium ion intake to be lowered while keeping the taste of the foodstuff unchanged.

21 Claims, No Drawings

SALT SUBSTITUTE AND FOODSTUFFS CONTAINING SAME

The present invention relates to a salt substitute utilizing whey mineral which is produced by reducing lactose and protein from whey. More particularly, the present invention relates to a salt substitute containing a combination of whey mineral and an alkali metal salt, or a combination of whey mineral, an alkali metal salt and an alkaline earth metal salt, and various foodstuffs in which it is used.

Recently it has become common knowledge that excess intake of sodium ion leads to hypertension or induces the action thereof as a promoter of stomach cancer. This has resulted in consumers avoiding excess sodium intake. A number of salt substitutes have consequently been introduced in which potassium ion, especially in the form of potassium chloride, is sued as a major ingredient in order to induce a salty taste. When used just like common salt, a foodstuff can be provided in which the sodium content is lowered while a salty taste is maintained. However, with all of these substitutes, the irritating, bitter, or discomforting taste that emanates from potassium chloride is felt too strongly, and the taste of any foodstuff containing it is substantially degraded. Therefore, development of a salt substitute which provides a salty taste comparable to that of common salt when used in its place and allows the sodium ion intake to be lowered while keeping the taste of the foodstuff unchanged has been strongly sought after.

The present invention fulfills such requirements. In other words, the present invention is based on the novel findings described below obtained by the present inventors and other. When whey mineral is used with potassium chloride, bittern and other alkali metal salts or with a combination of an alkali metal salt and an alkaline earth metal salt such as magnesium chloride, etc., the resulting substance has an enhanced salty taste and yet the bitter, puckery or discomforting taste tends to be masked. Furthermore, when a mixture of the type described above is used with one or more substances selected from the group consisting of a protein sweetener, a decomposition product of a protein, an amino acid, and a nucleic acid-related substance, discomforting, bitter and puckery tastes are almost completely eliminated and the salty taste is further enhanced. In the following, the present invention is more specifically described.

(1) A salt substitute which is prepared by combining whey mineral with an alkali metal salt.

(2) A salt substitute which is prepared by combining whey mineral with an alkali metal salt and an alkaline earth metal salt.

(3) A seasoning which is prepared by combining a salt substitute as described in either (1) or (2) above with one or more substances selected from the group consisting of a protein sweeteners, protein hydrolyzates, amino acids and nucleic acid-related substances.

(4) A salt substitute consisting of 10-80 parts (by weight) of whey mineral, and 20-90 parts (by weight) of alkali metal salts.

(5) salt substitute consisting of 10-45 45 parts by weight of whey mineral, 25-85 parts (by weight) of alkali metal salts and 5-30 parts (by weight) of alkaline earth metal salts.

(6) A seasoning which is prepared by combining 100 parts (by weight) of a salt substitute as described in either (4) or (5) above with one or more substances selected from the group consisting of 0.001-5 parts (by weight) of a protein sweetener, 0.1-10 parts (by weight) of a protein hydrolyzate, 1-10 parts (by weight) of an amino acid and 0.01 1 part (by weight) of a nucleic acid-related substance.

(7) A composition according to any of items (1)-(6) above wherein one or more alkali metal salts selected from the group consisting of sodium or potassium salts of inorganic acids and sodium or potassium salts of organic acids are used.

(8) A composition according to any of items (1)-(7) above wherein the alkali metal salt is potassium chloride and/or sodium chloride.

(9) A composition according to any of items (1)-(6) above wherein the alkaline earth metal salt is one or more of the group consisting of calcium or magnesium salts of an inorganic acid and calcium or magnesium salts of an organic acid.

(10) A composition according to any of items (1)-(6) above wherein whey mineral is prepared by concentrating the permeate which is filtrate obtained by intrafiltration of whey so that the lactose content is increased to about 50%, followed by removal of the lactose which crystallizes after the concentrated liquid is allowed to stand for a sufficient time.

(11) A composition according to any of items (1)-(6) above wherein the mineral (ash content) accounts for about 10-60% by weight of the whey mineral.

(12) A composition according to any of items (1)-(6) above wherein whey mineral with the following composition is used:

| Ingredient | Content (% by weight) |
| --- | --- |
| Total solid content | 96-98 |
| Lactose | 35-85 |
| Non-protein nitrogen | 1-5 |
| Ash content (mineral) | 10-60 |

(13) A composition according to item (8) above wherein one or more substances from the group consisting of acids and/or acid salts are used.

(14) A composition according to item (7) above with which 0.1-10 parts (relative to the total composition by weight) of one or more substances from the group consisting of acids and/or acid salts are combined.

(15) A foodstuff containing a composition according to any of times (1)-(14) above.

In the present invention, the term whey mineral is used to describe a concentrated product prepared by concentrating whey followed by removal of whey protein and lactose as far as possible, or dried solid matter of the concentrated product. A specific example of a suitable methods of preparation is as follows: the filtrate obtained by ultrafiltration of whey is concentrated till the lactose content reaches about 50%, lactose which precipitates after the concentrated liquid is left for 10-20 hours at 0° C. -20° C. is removed by, e.g., centrifugation, and the resultant liquid is concentrated or dried. The whey mineral thus obtained normally contains about 20% by weight of mineral.

Whey mineral with a higher content of mineral can be prepared by repeating the procedure described above. An example of the composition of a whey mineral (dried solid manner) used in the present invention is: total solid content 96-98%, lactose 35-85%, non-protein nitrogen 1-5%, ash content (mineral) 10-60%, the main ingredients of the latter being such cations as potassium 2-10%, calcium 1-5%, sodium 1-10%, magnesium 0.1-0.5%. Whey mineral prepared as described above changes color to brown during storage, but by modification of the preparation process, e.g., by adjusting the pH of the concentrated whey mineral from which the precipitated lactose has been removed to not more than 7, preferably between 7 and 4. by the addition of such acidic substances as citric acid, phytic acid, tartaric acid, etc., followed by drying, concentrated whey mineral or dried solid matter thereof can be obtained which is of good quality and does not undergo browning.

As alkali metal salts, potassium or sodium salts of organic or inorganic acids may be used. More particularly, suitable examples include sodium chloride, potassium chloride, sodium carbonate, sodium hydrogencarbonate, potassium carbonate, potassium hydrogencarbonate, sodium sulfate, sodium phosphate, potassium phosphate, sodium citrate, potassium citrate, potassium acetate, sodium tartrate, potassium tartrate, sodium lactate, potassium lactate, sodium adipate, bittern obtained from seawater and containing potassium chloride as a main ingredient, etc. Most preferably, potassium chloride, bittern and/or sodium chloride are used.

The ratio at which the whey mineral is mixed with these alkali metal salts depends on how salty the desired salt substitute should be and which alkali metal salt is being utilized. A preferable example of this ratio is 10-80 parts (hereinafter, ratio figures are expressed in weight terms) of whey mineral, and 20-90 parts of alkali metal salts.

As alkaline earth metal salts, calcium or magnesium salts of organic or inorganic acids may be used. More particularly, suitable examples include calcium chloride, magnesium chloride, calcium carbonate, magnesium carbonate, calcium sulfate, magnesium sulfate, calcium phosphate, magnesium phosphate, calcium citrate, magnesium citrate, calcium acetate, magnesium acetate, calcium malate, magnesium malate, calcium tartrate, magnesium tartrate, calcium lactate, magnesium lactate, calcium adipate, magnesium adipate, bittern obtained from seawater, animal bones, etc. A preferable example of the mixing range for these alkaline earth metal salts is, for example, 10-45 parts of whey mineral, 25-85 parts of alkali metal salts, and 5-30 parts of alkaline metal salts.

Salt substitutes according to the present invention can be made into a seasoning of much better taste by mixing one or more substances selected from the group consisting of protein sweeteners, protein hydrolyzates, amino acids and nucleic acid-related substances. Examples of protein sweeteners are thaumatin, monellin, miraclin, eto. obtained from fruits. The protein hydrolizate is a mixture of peptides and amino acids prepared by hydrolyzing a protein obtained from such animals as bovine, equine, swine, fish, and bird, or such plants as soy bean, wheat, nuts, cotton seeds, etc; examples of amino acids include glutamio acid, aspartic acid, cystine, phenylalanine, threonine, tyrosine, glycine, alanine, etc. produced either chemically or microbiologically. Examples of nucleic acid-related substances are guanylic acid, inosinic acid, uridylic acid, etc. The mixing ratio for these can be changed to a suitable one according to the purpose of use of the seasoning concerned. For example, one or more of the following may be mixed with 100 parts of a combination of the aforementioned whey mineral and alkali metal salts, or a combination of whey mineral, an alkali metal salt, and an alkaline earth metal salt: 0.001-5 parts of a protein sweetener, 0.1-10 parts of a decomposition product of a protein, 1-10 parts of amino acids, 0.01-1 part of nucleic acid-related substances.

The salt substitutes and seasonings according to the present invention described above are excellent in that bitter, puckery, and discomforting tastes due to potassium chloride, etc. are masked and yet the salty taste is enhanced. However, these mixtures have the disadvantage that they change color to brown when stored for a long time in a solid state such as powder, granule, etc., or a liquid state. This leads to a considerable reduction in their commercial value. The present inventors have found that by adding one or more substances selected from the group consisting of acids and/or acid salts to the mixture, browning during storage can be prevented. They have thus succeeded in inventing a low sodium content salt substitute with good preservability. The term acids means inorganic or organic acids; examples of suitable inorganic acids include phosphoric acid, metaphosphoric acid, etc., and examples of suitable organic acids include acetic acid. propionic acid. citric acid, tartaric acid, lactic acid, fumaric acid, adipic acid, ascorbic acid, phytic acid, and fruit juice, fruit, vinegar, fermented milk, acidic food, etc. containing these. Suitable examples of acid salts include such inorganic acid salts as acid phosphate salts, acid polyphosphate salts. etc.. and acid salts of the aforementioned organic acids. The range of suitable mixing ratios for these acids and/or acid salts is, for example, when potassium chloride is used as an alkaline earth metal salt, 10-80 parts of whey mineral, 89.9-10 parts of potassium chloride, and 0.1-10 parts of acids and/or acid salts. To a mixture having such a mixing ratio, suitable amounts of alkaline earth metals, and 0.001-5 parts of a protein sweetener, 0.1-10 parts of a decomposition product of a protein, 1-10 parts of amino acids, and 0.01-1 part of nucleio acid-related substances may optionally be added.

The salt substitutes according to the present invention described above can be used in various foodstuffs as a low sodium content salt substitute. The number of foodstuffs in which these can be used is enormous; more particularly, various types of noodles, macaroni, spaghetti, bread, snacks such as Japanese rice crackers, potato chips, processed tomato-based foods such as tomato juice, tomato puree, etc., pickled vegetables, various canned fish, dried fish, salt-preserved food, various types of cheese, bacon, ham, boiled fish paste, sausage, butter, margarine, etc. are suitable. The amount of salt substitute of the present invention to be added is selected according to the purpose of use, and there is no particular limitation in this respect.

In the following. the present invention is illustrated in more detail. but these examples are in no way to be taken as limiting.

EXAMPLE 1

To 100 l of fresh whey sweet which was obtained as a side product of Cheddar cheese manufacture, potassium hydroxide was added for neutralization, followed by ultrafiltration using a ultrafilter membrane impermeable to those substances with a molecular weight of not less than 20,000, under a pressure of 5 kg/cm$^2$, to obtain about 80 l of the filtrate. The resultant filtrate was concentrated in vacuo till its volume was reduced to about 1/10. The lactose concentration in the liquid concentrated as described above was about 50%, and the total solid content about 58%. After the concentrated liquid was cooled to 30° C., a small amount of lactose was added as seeded for crystallization, and the syrup allowed to stand at 15° C. for 10 hours. Precipitated lactose was separated by a centrifugal hydroextractor, and washed with cold water to give 3.1 kg of crystallized laotose. The weight of mother liquor separated by the centrifugal hydroextractor was about 5 kg. Whey mineral concentrate liquids with different pH values were prepared by adding various amounts of citric acid to this mother liquor, and they were charged into colorless transparent glass bottles, which were kept in a thermostat whose temperature was controlled as 38° C. for 30 days for observation of the change in states.

Alternatively, to about 5 kg of the mother liquor, 5 l of distilled water was added for dilution, and the pH was adjusted to various values by the addition of citric acid; when the resulting liquids are respectively spray dried, about 2.9 kg each of whey mineral powders with respective pHg values were obtained. These were put in polyethylene bags having a thickness of 50 μ, and stored at 38° C. for 30 days in a similar way for observation of the external appearance of the powder.

The results are shown in Table 1; all the powder samples whose pH was adjusted to not more than 7 were found to be stable whey mineral which did not shown any browning.

TABLE 1

Dependence of Stability of Whey Mineral Concentrate Liquid or Whey Mineral Powder on pH (stored at 38° C. for 30 days)

| pH of whey mineral concentrate liquid | state | pH of Whey mineral powder | state |
|---|---|---|---|
| 7.8 | changed to brown markedly | 7.8 | changed to brown markedly |
| 7.5 | changed to brown markedly | 7.5 | changed to brown markedly |
| 7.25 | changed to brown slightly | 7.25 | changed to brown slightly |
| 7.00 | no color change observed | 7.00 | no color change observed |
| 6.75 | no color change observed | 6.75 | no color change observed |
| 6.50 | no color change observed | 6.50 | no color change observed |
| 6.25 | no color change observed | 6.25 | no color change observed |
| 6.00 | no color change observed | 6.00 | no color change observed |
| 5.75 | no color change observed | 5.75 | no color change observed |
| 5.5 | no color change observed | 5.5 | no color change observed |

Note: pH of powdered whey mineral was determined in 10% solution

EXAMPLE 2

50 l of fresh sweet whey was neutralized by the addition of sodium hydroxide, and the liquid was ultrafiltered under the same conditions as described in Example 1 to obtain 41 l of filtrate. The filtrate was concentrated in vacuo at not higher than 40° C. till the volume was reduced to 1/10, and after addition of a small amount of lactose seed crystals, the liquid was allowed to stand for 12 hours at 10° C. The pH of this concentrated liquid was 7.8, the total solid content 57.1%, and the lactate content 48.9%. This concentrated liquid was subjected to centrifugal hydroextraction to remove the precipitated lactose. To 2.0 kg of the mother liquor thus obtained, phytic acid was added to adjust the pH to 5.8 to obtain whey mineral concentrate liquid. On the other hand, to 2 kg of the mother liquor, 2 l of distilled water was added and the pH was adjusted to 5.8 with phytic acid, followed by spray-drying to obtain whey mineral concentrate powder. The whey mineral concentrate liquid thus obtained was charged into a colorless and transparent glass bottle, and the whey mineral concentrate powder into a polyethylene bag with a thickness of 50 μ, and they were placed in a thermostat controlled at 38° C. to observe changes. Results are shown in Table 2; it is seen that the concentrate whose pH was controlled at 58.8 was stable.

TABLE 2

Storage Stability of Whey Mineral Concentrate Liquid and Whey Mineral Concentrate Powder

| | Description | | | |
|---|---|---|---|---|
| | Whey mineral concentrate liquid | | Whey mineral concentrate powder | |
| Days of storage at 38° C. | pH not adjusted | Present invention (pH adjusted) | pH not adjusted | Present invention (pH adjusted) |
| | 7.5 | 5.8 | 7.5 | 5.8 |
| 10 days | minutely changed to brown | no color change | minutely changed to brown | no color change |
| 20 days | slightly changed to brown | no color change | slightly changed to brown | no color change |
| 30 days | changed to brown | no color change | changed to brown | no color change |
| 60 days | markedly changed to brown | no color change | markedly changed to brown | no color change |

EXAMPLE 3

The pH of the mother liquor, prepared as described in Example 1, was adjusted to 5.6 with L-tartaric acid and a whey mineral concentrate liquid was prepared. This was charged into a color less transparent glass bottle, which was stored in a thermostat controlled at 40° C.; no color change was observed, which showed the stability of the whey mineral concentrate. On the other hand, the color of the concentrate whose pH was 7.8 and was not optimized changed to brown to a marked degree.

EXAMPLE 4

To 2 kg of the mother liquor prepared as described iun EXample 2, 2 l of distilled water was added. The pH of the liquid was adjusted to 6.00 with L-malic acid, followed by spray drying to obtain a whey mineral concentrate powder. This was charged into a polyethylene bag with a thickness of 50 μ, which was stored in a thermohygrostat controlled at a temperature 40 ° C. and humidity of 80%; no color change was observed, which showed the stability y of the whey mineral concentrate powder. On the other hand, the color of the powder whose pH was 7.5 and was not optimized changed to brown to a marked degree.

EXAMPLE 5

To 5 kg of the mother liquor prepared as described in Example 1, 5 l of distilled water was added and stirred well. The pH of the resultant Liquid was adjusted to 5.5 with phosphoric acid, followed by spray-drying to obtain whey mineral concentrate powder. To 85 parts of this powder, 15 parts of vegetable proteolytic extract powder was added and mixed, and the mixture was charged into a polyethylene bag with a thickness of 50 l, and stored in a thermohygrostat controlled at a temperature of 40° C. and humidity of 80%; no change in color was observed. On the other hand, the mixture of whey mineral concentrate powder with a pH of 7.8 which was not adjusted and vegetable proteolytic extract powder underwent marked browning.

EXAMPLE 6

A solid mixture (hereinafter referred to as A) of 80 parts of potassium chloride and 20 parts of whey mineral and another solid mixture (hereinafter referred to as B) of 79 parts of potassium chloride, 1 part of citric acid, and 20 parts of whey mineral were respectively charged into polyethylene bags with a thickness of 20 l, which were stored in a thermohygrostat controlled at a temperature of 38° C. and humidity of 80%. The time course of color tone change was observed microscopically. The results are shown in Table 3; the product according to the present invention (B) did not undergo browning, showing its good stability.

TABLE 3

| Storage | Test item | |
|---|---|---|
| (days) | A | B |
| 5 | very slightly changed to brown | no change in color tone |
| 10 | slightly changed to brown | no change in color tone |
| 15 | changed to brown | no change in color tone |
| 30 | markedly changed to brown | no change in color tone |
| 60 | markedly to brown | no change in color tone |

EXAMPLE 7

A 10% solution (hereinafter referred to as C) of a composition consisting of 20 parts of whey mineral, 79.99 parts of potassium chloride, and 0.01 part of thaumatin (protein sweetener), and a solution (hereinafter referred to as D) prepared by a 0.1% addition of phosphoric acid to solution C were sterilized at 120° C. for 20 minutes followed by storage in a thermostat controlled at 38° C., and the color tone change was observed macroscopically. The results are shown in Table 4; the product according to the present invention (D) did not undergo browning, showing its good stability.

TABLE 4

| Storage | Test item | |
|---|---|---|
| (days) | C | D |
| 5 | very slightly changed to brown | no change in color tone |
| 10 | slightly changed to brown | no change in color tone |
| 15 | changed to brown | no change in color tone |
| 30 | markedly changed to brown | no change in color tone |

EXAMPLE 8

A solid matter (hereinafter referred to as E) consisting of 30 parts of whey mineral, 65 parts of potassium chloride, and 5 parts of beef extract (protein content 20%), and another solid matter (hereinafter referred to as F) consisting of 30 parts of whey mineral, 63 parts of potassium chloride, 2 parts of monosodium fumarate, and 5 parts of beef extract were subjected to a 60-day storage test using the same method as described in Example 6. The solid matter E showed marked browning, but F, a product according to the present invention, did not show any color tone change, thus showing its stability.

EXAMPLE 9

A 10% solution (hereinafter referred to as G) of a composition consisting of 20 parts of whey mineral, 79 parts of sodium chloride, and 1 part of sodium inosinate, and another solution (hereinafter referred to as H) prepared by addition of 0.5% acid sodium metaphosphate to the solution G were sterilized at 120° C. for 20 minutes. followed by a 60-day storage test using the same method as described in Example 7; G showed marked browning, while H, a product according to the present invention, did not show any color tone change, showing its stability.

EXAMPLE 10

A solid mixture (hereinafter referred to as I) consisting of 60 parts of whey mineral, 39 parts of potassium chloride, and 1 part of glycine, and another solid mixture (hereinafter referred to as J) consisting of 60 parts of whey mineral, 36 parts of potassium chloride, 1 part of glycine, and 3 parts of powdered orange juice were subjected to a 90-day storage test using the same method as described in Example 6; I showed a marked browning, while J, a product according to the present invention, did not show any color tone change, thus showing its stability.

EXAMPLE 11

A 10% solution (hereinafter referred to as K) of a composition consisting of 20 parts of whey mineral, 75 parts of potassium chloride, and 5 parts of a protein decomposition product, and another solution (hereinafter referred to as L) prepared by addition of 1% fermented milk to the solution K were sterilized at 120° C. for 20 minutes, followed by a 60-day storage test using the same method as described in Example 7; K showed marked browning, while L, a product according to the present invention, did not show any color tone change, revealing its stability.

EXAMPLE 12

A solid mixture (hereinafter referred to as M) consisting of 30 parts of whey mineral, 33 999 parts of potassium chloride, 30 parts of common salt, 0.001 part of thaumatin (protein sweetener), 1 part of L-glutamic acid, and 5 parts of pork extract (protein content: 20%), and another solid mixture (hereinafter referred to as N) consisting of 30 parts of whey mineral, 30 parts of potassium chloride, 3 parts of citric acid, 0.999 parts of potassium dihydrogen-phosphate, 30 parts of common salt, 0.001 part of thaumatin (protein sweetener), 1 part of L-glutamic acid, and 5 parts of pork extract (protein content: 20%) were subjected to a 60-day storage test by the same method as described in Example 6; M showed marked throwning, while N, a product according to the present invention, did not show any color tone change, proving its stability.

EXAMPLE 13

Twenty women panelists aged 19–25 years were asked in a blind test to select a solution containing a potassium chloride aqueous solution which had salty taste equivalent to that of a 2% (all percentages are expressed by weight) aqueous solution of a mixture consisting of 4 parts of potassium chloride, and 1 part of whey mineral. At the same time, they were also asked to select a potassium chloride aqueous solution which had a potassium chloride taste equivalent to that of the mixture. The results are shown in Table 5.

TABLE 5

Salty Taste and Potassium Chloride Taste of 2% Mixture Solution of Whey Mineral and Potassium Chloride (4:1)

| Potassium chloride concentration with equivalent salty taste (%) | Number of panelists | Taste of potassium chloride Potassium chloride concentration with equivalent potassium chloride taste (%) | Number of panelists |
| --- | --- | --- | --- |
| 1.2 | 0 | — | — |
| 1.4 | 0 | — | — |
| 1.6 | 0 | — | — |
| 1.8 | 3 | 1.2 | 2 |
|  |  | 1.4 | 1 |
| 2.0 | 8 | 1.2 | 5 |
|  |  | 1.4 | 3 |
| 2.2 | 4 | 1.2 | 3 |
|  |  | 1.4 | 1 |
| 2.4 | 4 | 1.2 | 3 |
|  |  | 1.4 | 1 |
| 2.6 | 1 | 1.2 | 1 |

As is clearly seen from Table 5, a combination of whey mineral and potassium chloride enhances the salty taste of potassium chloride and masks the potassium chloride taste.

EXAMPLE 14

A 1% solution of a composition consisting of 20 parts of whey mineral (sodium content: 3%), 79.99 parts of potassium chloride, and 1.01 part of thaumatin (protein sweetener) was prepared and the taste of the solution was compared with that of a 1% potassium chloride solution or a 1% common salt solution. The composition solution tasted better in that it had an enhanced salty taste and was free from such unpleasant tastes as the puckery, astringent taste of potassium chloride or the irritating taste of common salt.

EXAMPLE 15

A 1% solution of a composition consisting of 30 parts of whey mineral (sodium content: 3%), 65 parts of potassium chloride, and 5 parts of beef extract (protein content: 20%) was prepared and the taste of the solution was compared with that of a 1% potassium chloride solution or a 1% common salt solution. The composition solution tasted better in that the salty taste was enhanced while it was free from such unpleasant tastes as the puckery, astringent taste of potassium chloride or the irritating taste of common salt.

EXAMPLE 16

A 1% solution of a composition consisting of 60 parts of whey mineral (sodium content: 3%), 39 parts of potassium chloride, and 1 part of glycine was prepared and the taste of the solution was compared with that of a 1% potassium chloride solution or a 1% common salt solution. The composition solution tasted better in that it had an enhanced salty taste and was free from such unpleasant tastes as the puckery, astringent taste of potassium chloride or the irritating taste of common salt.

EXAMPLE 17

A 1% solution of a composition consisting of 20 parts of whey mineral (sodium content: 3%), 79 parts of potassium chloride, and 1 part of sodium 5'-inosinate was prepared and the taste of the solution was compared with that of a 1% potassium chloride solution or a 1% common salt solution. The composition solution tasted better in that it had an enhanced salty taste and was free from such unpleasant tastes as the puckery, astringent taste of potassium chloride or the irritating taste of common salt.

EXAMPLE 18

A 1% solution of a composition consisting of 20 parts of whey mineral (sodium content: 3%), 75 parts of potassium chloride, and 5 parts of a protein decomposition product was prepared and the taste of the solution was compared with that of a 1% potassium chloride solution or a 1% common salt solution. The composition solution tasted better in that it had an enhanced salty taste and was free from such unpleasant tastes as the puckery, astringent taste of potassium chloride or the irritating taste of common salt.

EXAMPLE 19

A 1% solution of a composition consisting of 30 parts of whey mineral (sodium content: 3%), 33.999 parts of potassium chloride, and 30 parts of common salt, 0.001 part of thaumatin (protein sweetener), 1 part of L-glutamic acid, and 5 parts of pork extract (protein content: 20%) was prepared and the taste of the solution was compared with that of a 1% potassium chloride solution or a 1% common salt solution. The composition solution tasted better in that it had an enhanced salty taste and was free from such unpleasant tastes as the puckery, astringent taste of potassium chloride or the irritating taste of common salt.

EXAMPLE 20

Thirty panelists aged 19–25 years were asked in a blind test to select a mayonnaise preparation which had a salty taste equivalent to that of mayonnaise prepared by a routine method and containing a 2% composition consisting of 5 parts of common salt and 1 part of whey mineral from among mayonnaise preparations containing 1.4–2.8% common salt. The results are shown in Table 6. The same panelists were also asked in a similar way to select a mayonnaise preparation which had a salty taste equivalent to that of mayonnaise prepared by a routine method and containing a 2% composition consisting of 4 parts of bittern (potassium chloride: 90%, sodium chloride: 5%, and magnesium sulfate: 5%) and 1 part of whey mineral from among mayonnaise preparations with different common salt contents. At the same time, the taste was compared with that of mayonnaise containing 2% bittern alone to examine the masking effects with respect to the bittern taste. The results are shown in Table 7.

TABLE 6

Salty Taste of Mayonnaise Containing Mixture of Sodium Chloride and Whey Mineral (5:1)

| Common salt content of mayonnaise with equivalent salty taste (%) | Number of panelists |
|---|---|
| 1.4 | 0 |
| 1.6 | 1 |
| 1.8 | 2 |
| 2.0 | 3 |
| 2.2 | 8 |
| 2.4 | 8 |
| 2.6 | 7 |
| 2.8 | 1 |

TABLE 7

Salty Taste of Mayonnaise Containing Mixture of Bittern and Whey Mineral (5:1) and Masking Effects on Bittern

| Common salt content of mayonnaise with equivalent salty taste (%) | Number of panelists | Masking effects on bittern taste when taste of mayonnaise containing bittern alone was compared with that of mayonnaise of present invention | |
|---|---|---|---|
| | | Masked (persons) | Not masked (persons) |
| 1.4 | 1 | 26 | 4 |
| 1.6 | 1 | 27 | 3 |
| 1.8 | 2 | 28 | 2 |
| 2.0 | 3 | 29 | 1 |
| 2.2 | 9 | 30 | 0 |
| 2.4 | 9 | 30 | 0 |
| 2.6 | 5 | 27 | 3 |
| 2.8 | 0 | 26 | 4 |

As is clearly seen from Table 6 and Table 7, a combination of whey mineral and an alkali metal salt or bittern enhances the salty taste and masks the bittern taste (unpleasant, puckery, or irritating taste of potassium chloride, etc.)

EXAMPLE 21

The same panelists as participated in Example 20 were asked to taste a light-taste soy sauce which was prepared by a routine method to contain a 16% composition selected from (1)–(4) listed in the following and two control preparations of light-taste soy sauce, one containing 16% common salt, and the other containing 16% potassium chloride. The results are shown in Table 8.

Compositions:
(1) 30 parts of whey mineral, 50 parts of potassium chloride and 20 parts of sodim chloride.
(2) 30 parts of whey mineral, 50 parts of potassium chloride, 10 parts of sodium chloride and 10 parts of magnesium chloride.
(3) A composition of (1) and 0.01 part of tharmatin (protein sweetener).
(4) A composition of (2) and 1 part of sodium L-glutamate and 3 parts of protein decomposition product.

All light-taste soy sauce preparations with any of the above compositions were judged to have better taste, saltier but milder, than the controls.

TABLE 8

| Composition of present invention | Salty taste compared with that of controls | | Taste |
|---|---|---|---|
| | Enhanced (persons) | Not enhanced (persons) | |
| 1 | 23 | 7 | All tasted better and milder, without irritating taste, than controls containing common salt. |
| 2 | 26 | 4 | |
| 3 | 28 | 2 | |
| 4 | 27 | 3 | |

EXAMPLE 22

Thirty panelists aged 19–25 years were asked in a blind test to select a fresh noodle preparation which had a salty taste equivalent to that of fresh noodles prepared by a routine method containing a 2% (all percentages are expressed in weight terms) composition consisting of 5 parts of common salt and 1 part of whey mineral from fresh noodle preparations containing f1.4–2.8% common salt. The results are shown in Table 9. The same panelists were also asked in a similar way to select a fresh noodle preparation which had a salty taste equivalent to that of a fresh noodle preparation prepared by a routine method containing a 2% composition consisting of 5 parts of bittern (potassium chloride: 90%, sodium chloride: 5%, and magnesium sulfate: 5%) and 1 part of whey mineral from fresh noodle preparations with different common salt contents. At the same time. The taste was compared with that of fresh noodles containing 2% bittern alone to examine the masking effects on the taste of bittern. The results are shown in Table 10.

TABLE 9

Salty Taste of Fresh Noodles Containing Mixture of Sodium Chloride and Whey Mineral (5:1)

| Salt content of fresh noodles with equivalent salty taste (%) | Number of panelists |
|---|---|
| 1.4 | 0 |
| 1.6 | 1 |
| 1.8 | 2 |
| 2.0 | 3 |
| 2.2 | 8 |
| 2.4 | 8 |
| 2.6 | 7 |
| 2.8 | 1 |

TABLE 10

Salty Taste of Fresh Noodles Containing Mixture of Bittern and Whey Mineral (5:1) and Masking Effects on Bittern Taste

| Salt content of fresh noodles with equivalent salty taste (%) | Number of panelists | Masking effects on bittern taste when taste of fresh noodles containing bittern alone was compared with that of fresh noodles of present invention | |
|---|---|---|---|
| | | Masked (persons) | Not masked (persons) |
| 1.4 | 1 | 26 | 4 |
| 1.6 | 1 | 27 | 3 |
| 1.8 | 2 | 28 | 2 |
| 2.0 | 3 | 29 | 1 |
| 2.2 | 9 | 30 | 0 |
| 2.4 | 9 | 30 | 0 |
| 2.6 | 5 | 27 | 3 |
| 2.8 | 0 | 26 | 4 |

As is clearly seen from Table 9 and Table 10, a combination of whey mineral and an alkali metal salt or bittern enhances the salty taste and masks the bittern taste (unpleasant, puckery, and irritating taste of potassium chloride, etc.)

EXAMPLE 23

The panelists who participated in the test of Example 22 were asked to taste instant chinese noodles prepared by a routine method to contain 1.4% of the ingredients listed in Example 21 above instead of common salt, and two types of control instant chinese noodles, one containing 1.4% common salt, and the other containing 1.4% potassium chloride. The results are shown in Table 11.

All noodles containing one of the listed compositions tasted better saltier and milder than the controls.

TABLE 11

| Composition of present invention | Salty taste compared with that of controls | | Taste |
|---|---|---|---|
| | Enhanced (persons) | Not enhanced (persons) | |
| 1 | 23 | 7 | All tasted better and milder, without irritating taste, than controls containing common salt. |
| 2 | 26 | 4 | |
| 3 | 28 | 2 | |
| 4 | 27 | 3 | |

What is claimed is:

1. A slat substitute consisting essentially of an alkali metal salt with an amount of whey mineral effective to enhance the saltiness of said alkali metal salt.

2. A salt substitute according to claim 1, which further includes an alkaline earth metal salt.

3. A seasoning according to claim 1 which further includes a substance selected from the group consisting of protein sweeteners, protein hydrolyzates, amino acids, nucleic and acid-related substances.

4. A salt substitute consisting essentially of 10-80 parts by weight of whey mineral and 20-90 parts by weight of alkali metal salts.

5. A salt substitute consisting essentially of 10-45 parts by weight of whey mineral, 25-85 parts by weight of alkali metal salts and 5-30 parts (by weight) of alkaline earth metal salts.

6. A seasoning which is prepared by combining 100 parts by weight of a salt substitute described in claim 4 with a substance selected from the group consisting of 0.001-5 parts by weight of a protein sweetener, 0.1-10 parts by weight of a protein hydrolizate, 1-10 parts by weight of an amino acid, 0.01-1 part by weight of a nuycleic acid-related substance and mixtures thereof.

7. A composition according to claim 1 wherein the alkali metal salts are selected from the group consisting of sodium or potassium salts of inorganic acids and sodium or potassium salts of organic acids.

8. A composition according to claim 7 wherein the alkali metal salt is potassium chloride and/or sodium chloride.

9. A composition according to claim 2 wherein the alkaline earth metal salt is a member selected from the group consisting of calcium or magnesium salts of inorganic acids, and calcium or magnesium salts or organic acids.

10. A composition according to claim 1 wherein the whey mineral is prepared by concentrating a filtrate obtained by ultrafiltration of whey so that the lactose content is increased to about 50%, followed by removal of the lactose which is crystallized after the concentrated liquid is allowed to stand for a suitable time.

11. A composition according to claim 1 wherein minerals (ash content) account for about 10-60% by weight of the whey mineral.

12. A composition according to claim 1 wherein whey mineral with the following composition is used:

| Ingredient | Content (% by weight) |
|---|---|
| Total solid content | 96-98 |
| Lactose | 35-85 |
| Non-protein nitrogen | 1-5 |
| Ash content (Mineral) | 10-60 |

13. A composition according to claim 8 further including another substance selected form the group consisting of acids and acid salts.

14. A composition according to claim 7 further including 0.1-10% relative to the total composition by weight of a substance selected from the group consisting of acids and acid salts.

15. A foodstuff containing a composition according to claim 1.

16. A method of providing a food product having a salty taste, comprising the step of adding a mixture, consisting essentially of an alkali metal salt and an amount of mineral whey effective to enhance the saltiness of said salt, to a foodstuff in an amount effective to season said foodstuff.

17. In a method for providing a food product having a salty taste, comprising the step of adding sodium chloride to a foodstuff, the improvement wherein comprising substituting a mixture, including an alkali metal salt and an amount of mineral whey effective to enhance the saltiness of said alkali metal salt, for at least a portion of said sodium chloride.

18. The salt substitute of claim 1, wherein said alkali metal salt is a potassium salt.

19. The method of claim 17, wherein said alkali metal salt is a potassium salt.

20. The product of the process of claim 17.

21. The product of the process of claim 19.

* * * * *